(12) United States Patent
Park et al.

(10) Patent No.: US 10,517,074 B2
(45) Date of Patent: Dec. 24, 2019

(54) METHODS FOR ALLOCATING DATA CHANNEL RESOURCES IN A WIRELESS COMMUNICATION SYSTEM AND APPARATUSES

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/672,368

(22) Filed: Aug. 9, 2017

(65) Prior Publication Data

US 2018/0049176 A1 Feb. 15, 2018

(30) Foreign Application Priority Data

Aug. 11, 2016 (KR) .................. 10-2016-0102627
May 29, 2017 (KR) .................. 10-2017-0065832

(51) Int. Cl.
*H04W 72/00* (2009.01)
*H04W 72/04* (2009.01)
*H04L 5/00* (2006.01)
*H04W 72/12* (2009.01)

(52) U.S. Cl.
CPC ....... *H04W 72/0406* (2013.01); *H04L 5/0044* (2013.01); *H04L 5/0053* (2013.01); *H04L 5/0092* (2013.01); *H04W 72/0446* (2013.01); *H04W 72/12* (2013.01)

(58) Field of Classification Search
CPC ... H04W 72/085; H04W 72/04; H04W 76/02; H04W 16/10; H04W 16/14; H04W 24/00; H04W 28/16; H04W 28/18; H04W 28/24; H04W 28/04
USPC ............................................ 455/450, 452.1
See application file for complete search history.

(56) References Cited

U.S. PATENT DOCUMENTS

| 9,877,278 | B2* | 1/2018 | Sartori | .............. H04W 52/0209 |
| 2015/0208415 | A1* | 7/2015 | Xu | .......... H04L 5/001 370/329 |
| 2016/0270038 | A1* | 9/2016 | Papasakellariou | .. H04W 72/042 |
| 2016/0374080 | A1* | 12/2016 | Wei | .................... H04W 74/0833 |
| 2017/0026998 | A1* | 1/2017 | Ahn | ..................... H04L 5/0007 |
| 2017/0196019 | A1* | 7/2017 | Kim | .................... H04W 74/006 |
| 2017/0230156 | A1* | 8/2017 | Fakoorian | ............... H04W 4/70 |
| 2017/0238298 | A1* | 8/2017 | Wang | .................... G01S 5/0236 455/452.1 |

(Continued)

OTHER PUBLICATIONS

Samsung, "Definition and Signaling of Narrow-bands", R1-154092, 3GPP TSG RAN WG1 #82, Beijing, China, Aug. 24-28, 2015, pp. 1-3.

*Primary Examiner* — Temica M Beamer
(74) *Attorney, Agent, or Firm* — IP Legal Services, LLC

(57) ABSTRACT

Methods may be provided for allocating up/downlink data channel (that is, PDSCH and PUSCH) resource for a machine type communication (MTC) terminal in 3GPP LTE/LTE advanced system and for configuring a Downlink Control Information (DCI) for it. Further, a method may be provided for allocating up/downlink data channel resource for further enhanced MTC terminal which supports a up/downlink data channel (that is, PDSCH and PUSCH) bandwidth enhanced as compared with the MTC terminal (BL/CE UE) defined in LTE rel-13.

16 Claims, 13 Drawing Sheets

(56) References Cited

U.S. PATENT DOCUMENTS

2017/0289973 A1\* 10/2017 Yang ..................... H04L 27/26
2018/0176788 A1\* 6/2018 Yeo ...................... H04L 27/263

\* cited by examiner

FIG.1

Table 7.1.6.3-1: $N_{RB}^{step}$ values vs. Downlink System Bandwidth

| System BW ($N_{RB}^{DL}$) | $N_{RB}^{step}$ |
|---|---|
| | DCI format 1C |
| 6-49 | 2 |
| 50-110 | 4 |

FIG.2

Table 8.1.3-1: Resource block(s) allocation for BL/CE UE configured with CEModeB.

| Value of resource allocation field | Allocated resource blocks |
|---|---|
| '000' | 0 |
| '001' | 1 |
| '010' | 2 |
| '011' | 3 |
| '100' | 4 |
| '101' | 5 |
| '110' | 0 and 1 |
| '111' | 2 and 3 |

FIG.3

Table 9.1.5-1a: MPDCCH candidates monitored by a BL/CE UE
(CEModeA, MPDCCH-PRB-set size = 2PRBs or 4PRBs)

| $N'^{X_p}_{RB}$ | $R$ | $M'^{(L')}_p$ | | | | |
|---|---|---|---|---|---|---|
| | | L'=2 | L'=4 | L'=8 | L'=16 | L'=24 |
| 2 | r1 | 2 | 1 | 1 | 0 | 0 |
| 4 | | 1 | 1 | 1 | 1 | 0 |
| 2 | r2 | 2 | 1 | 1 | 0 | 0 |
| 4 | | 1 | 1 | 1 | 1 | 0 |
| 2 | r3 | 2 | 1 | 1 | 0 | 0 |
| 4 | | 1 | 1 | 1 | 1 | 0 |
| 2 | r4 | 2 | 1 | 1 | 0 | 0 |
| 4 | | 1 | 1 | 1 | 1 | 0 |

FIG.4

Table 9.1.5-1b: MPDCCH candidates monitored by a BL/CE UE
(CEModeA, MPDCCH-PRB-set size – 2+4PRBs)

| MPDCCH PRB set | R | $M_p^{'(L')}$ | | | | |
|---|---|---|---|---|---|---|
| | | L'=2 | L'=4 | L'=8 | L'=16 | L'=24 |
| 2 PRB set in 2+4 PRB set | r1 | 1 | 1 | 0 | 0 | 0 |
| 4 PRB set in 2+4 PRB set | | 0 | 0 | 2 | 1 | 0 |
| Both PRB sets in 2+4 PRB set | | 0 | 0 | 0 | 0 | 1 |
| 2 PRB set in 2+4 PRB set | r2 | 0 | 1 | 1 | 0 | 0 |
| 4 PRB set in 2+4 PRB set | | 0 | 0 | 2 | 1 | 0 |
| Both PRB sets in 2+4 PRB set | | 0 | 0 | 0 | 0 | 1 |
| 2 PRB set in 2+4 PRB set | r3 | 0 | 0 | 0 | 0 | 0 |
| 4 PRB set in 2+4 PRB set | | 0 | 0 | 1 | 1 | 0 |
| Both PRB sets in 2+4 PRB set | | 0 | 0 | 0 | 0 | 1 |
| 2 PRB set in 2+4 PRB set | r4 | 0 | 0 | 0 | 0 | 0 |
| 4 PRB set in 2+4 PRB set | | 0 | 0 | 0 | 0 | 0 |
| Both PRB sets in 2+4 PRB set | | 0 | 0 | 0 | 0 | 1 |

FIG.5

Table 9.1.5-2a: MPDCCH candidates monitored by a BL/CE UE
(CEModeB, MPDCCH-PRB-set size – 2PRBs or 4PRBs)

| $N'^{X_p}_{RB}$ | R | $M'^{(L')}_p$ | | | | |
|---|---|---|---|---|---|---|
| | | L'=2 | L'=4 | L'=8 | L'=16 | L'=24 |
| 2 | r1 | 0 | 0 | 1 | 0 | 0 |
| 4 | | 0 | 0 | 1 | 1 | 0 |
| 2 | r2 | 0 | 0 | 1 | 0 | 0 |
| 4 | | 0 | 0 | 1 | 1 | 0 |
| 2 | r3 | 0 | 0 | 1 | 0 | 0 |
| 4 | | 0 | 0 | 1 | 1 | 0 |
| 2 | r4 | 0 | 0 | 1 | 0 | 0 |
| 4 | | 0 | 0 | 1 | 1 | 0 |

FIG.6

Table 9.1.5-2b: MPDCCH candidates monitored by a BL/CE UE
(CEModeB, MPDCCH-PRB-set size – 2+4PRBs)

| MPDCCH PRB set | R | $M_p^{\prime(L')}$ | | | | |
|---|---|---|---|---|---|---|
| | | $L'=2$ | $L'=4$ | $L'=8$ | $L'=16$ | $L'=24$ |
| 2 PRB set in 2+4 PRB set | r1 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |
| 2 PRB set in 2+4 PRB set | r2 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |
| 2 PRB set in 2+4 PRB set | r3 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |
| 2 PRB set in 2+4 PRB set | r4 | 0 | 0 | 1 | 0 | 0 |
| 4 PRB set in 2+4 PRB set | | 0 | 0 | 0 | 1 | 0 |
| Both PRB sets in 2+4 PRB set | | 0 | 0 | 0 | 0 | 1 |

FIG. 7

Table 9.1.5-3: Determination of repetition levels

| $r_{max}$ | $r1$ | $r2$ | $r3$ | $r4$ |
|---|---|---|---|---|
| 1 | 1 | - | - | - |
| 2 | 1 | 2 | - | - |
| 4 | 1 | 2 | 4 | - |
| >=8 | $r_{max}/8$ | $r_{max}/4$ | $r_{max}/2$ | $r_{max}$ |

FIG.8

Table 9.1.5-4: Repetition levels for Type1-MPDCCH common search space

| $r_{max}$ | r1 | r2 | r2 | r4 |
|---|---|---|---|---|
| 256 | 2 | 16 | 64 | 256 |
| 128 | 2 | 16 | 64 | 128 |
| 64 | 2 | 8 | 32 | 64 |
| 32 | 1 | 4 | 16 | 32 |
| 16 | 1 | 4 | 8 | 16 |
| 8 | 1 | 2 | 4 | 8 |
| 4 | 1 | 2 | 4 | - |
| 2 | 1 | 2 | - | - |
| 1 | 1 | - | - | - |

FIG. 9

Table 9.1.5-5: Mapping for DCI subframe repetition number

| R | DCI subframe repetition number |
|---|---|
| r1 | 00 |
| r2 | 01 |
| r3 | 10 |
| r4 | 11 |

METHODS FOR ALLOCATING DATA CHANNEL RESOURCES IN A WIRELESS COMMUNICATION SYSTEM AND APPARATUSES

CROSS-REFERENCE TO RELATED APPLICATIONS

This application claims priority from Korean Patent Application Nos. 10-2016-0102627 and 10-2017-0065832, filed on Aug. 11, 2016 and May 29, 2017, which are hereby incorporated by reference for all purposes as if fully set forth herein.

BACKGROUND OF THE INVENTION

Field of the Invention

The present exemplary embodiments relate to a method and an apparatus for allocating uplink/downlink data channel resources in a wireless communication system.

Description of the Related Art

As a long term evolution (LTE)/LTE-advanced network spreads, mobile communication service providers want to minimize a number of radio access terminals (RAT) to reduce a network maintenance cost. However, due to abrupt increment in machine type communication (MTC) products based on a global system for mobile communication (GSM)/general packet radio service (GPRS) network, there is a problem in that the mobile communication service providers need to separately operate two RATs, one using an LTE/LTE-advanced network for general data transmission and the other using a GSM/GPRS network for an MTC.

Therefore, in order to reduce a unit price of a terminal as compared with a typical normal LTE terminal, in consideration of an MTC application scenario such as a bandwidth reduced low complexity user equipment (BL UE) in which a transmission/reception bandwidth of the terminal is limited to six PRBs (physical resource blocks) and the number of transmission/reception antennae is limited to one or smart metering installed in a 'deep indoor' environment such as a basement, a coverage enhancement (CE) mode is defined as a CE UE, and a standard technology for supporting the BL/CE UE is defined in 3GPP Release-13.

Further enhancement for BL/CE UE defined in 3GPP Release-13 will be discussed in 3GPP Release-14.

In this case, the UE requires data rates enhanced as compared with the typical 3GPP Release-13 BL/CE UE and supports PDSCH and PUSCH transmission/reception bandwidth which are extended more than a narrowband defined as a size of 6 PRBs based on a maximum transmission/reception bandwidth of the existing 3GPP Release-13 BL/CE UE. Therefore, it is difficult to reuse a resource allocating method and a downlink control information (DCI) format for 3GPP Release-13 BL/CE UE.

SUMMARY OF THE INVENTION

An aspect of the present exemplary embodiments is to provide a data channel resource allocating method and a DCI format for BL/CE UE when an extended data transmission/reception bandwidth is supported for BL/CE UE defined in 3GPP Release-13.

According to an aspect of the present exemplary embodiments, there is provided a method for allocating a data channel resource in a wireless communication system, including: configuring a narrowband with six consecutive physical resource blocks which configure a system bandwidth; allocating one or more of the configured narrowbands for transmitting and receiving a data channel; and transmitting information indicating the allocation of one or more narrowbands through downlink control information.

According to another aspect of the present exemplary embodiments, there is provided a method for monitoring allocation of a data channel resource in a wireless communication system, including: receiving downlink control information from a base station; identifying one or more narrowbands allocated for transmission/reception of a data channel through the downlink control information; and transmitting/receiving the data channel thorough the one or more allocated narrowbands.

According to still another aspect of the present exemplary embodiments, there is provided a base station which allocates a data channel resource in a wireless communication system. The base station may include: a control unit configured to configure a narrowband with six consecutive physical resource blocks which configure a system bandwidth, allocate one or more of the configured narrowband for transmitting and receiving a data channel, and generate downlink control information including information indicating the allocation of one or more narrowbands; and a transmitting unit configured to transmit the downlink control information to a terminal.

According to still another aspect of the present exemplary embodiments, there is provided a terminal for monitoring allocation of a data channel resource in a wireless communication system. The terminal may include: a receiving unit configured to receive downlink control information from a base station; and a control unit configured to identify one or more narrowbands allocated to transmit/receive a data channel through the downlink control information and control transmission/reception of the data channel through the one or more allocated narrowbands.

According to the present exemplary embodiments, it is possible to provide a specific method for allocating data channel resources and a method for configuring a DCI corresponding to the resource allocation when an extended data transmission/reception bandwidth is supported for BL/CE UE defined in 3GPP Release-13.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a view illustrating an example of $N_{RB}^{step}$ determined in accordance with a downlink system bandwidth in a wireless communication system according to the present exemplary embodiments;

FIG. 2 is a view illustrating an example of resource block allocation for BL/CE UE set in a CEModeB in a wireless communication system according to the present exemplary embodiments;

FIGS. 3 to 6 are views illustrating an example of a MPDCCH candidate which is monitored by BL/CE UE in a wireless communication system according to the present exemplary embodiments;

FIG. 7 is a view illustrating an example of determination of a repetition level in a wireless communication system according to the present exemplary embodiments;

FIG. 8 is a view illustrating an example of a repetition level for a Type1-MPDCCH shared search space in a wireless communication system according to the present exemplary embodiments;

FIG. 9 is a view illustrating an example of mapping for a DCI subframe repetition number in a wireless communication system according to the present exemplary embodiments;

DETAILED DESCRIPTION OF THE EMBODIMENT

Figure 10:
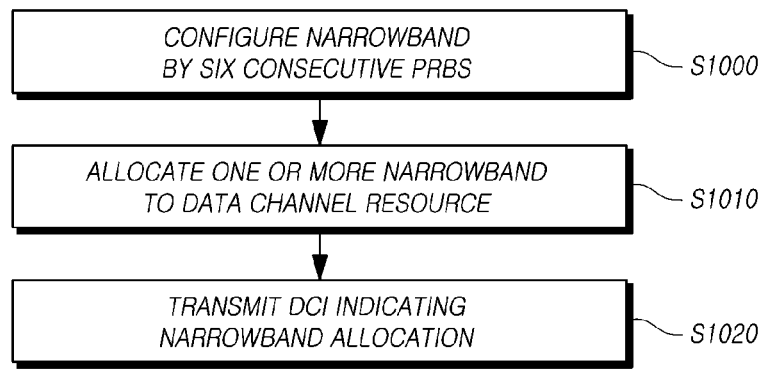
FIG. 10 is a view illustrating a method for allocating data channel resources in a wireless communication system according to the present exemplary embodiments.

Hereinafter, some exemplary embodiments of the present disclosure will be described in detail with reference to the accompanying drawings. When reference numerals denote components in the drawings, even though the like components are illustrated in different drawings, it should be understood that like reference numerals refer to the same components. In addition, in the description of the present disclosure, the detailed descriptions of publicly known related constitutions or functions thereof may be omitted if they make the gist of the present disclosure unclear.

In this specification, a machine type communication (MTC) terminal may refer to a terminal which supports a low cost (or low complexity) or a terminal which supports a coverage enhancement. In this specification, an MTC terminal may refer to a terminal which supports a low cost (or low complexity) and coverage enhancement. Alternatively, in this specification, an MTC terminal may refer to a terminal which is defined as a specific category to support a low cost (or low complexity) and/or coverage enhancement.

In other words, in this specification, the MTC terminal may refer to newly defined 3GPP Release-13 low cost (or low complexity) UE category/type which performs an LTE based MTC related operation. Alternatively, in this specification, the MTC terminal may refer to an UE category/type defined in an existing 3GPP Release-12 or lower which supports an enhanced coverage as compared with the existing LTE coverage or supports low power consumption or a newly defined Release-13 low cost (or low complexity) UE category/type.

The wireless communication system in the present disclosure is widely disposed to provide various communication services such as voice, packet data, and the like. The wireless communication system includes user equipment (UE) and a base station (BS or eNB). In this specification, the user terminal is a comprehensive concept which means a terminal in a wireless communication and needs to be interpreted as a concept which includes not only user equipment (UE) in a wideband code division multiple access (WCDMA), LTE, and high speed packet access (HSPA) but also a mobile station (MS), a user terminal (UT), a subscriber station (SS), and a wireless device in a GSM.

A base station or a cell generally refers to a station in which communication with a user terminal is performed and is also referred to as another terminology such as a node-B, evolved node-B (eNB), a sector, a site, a base transceiver system (BTS), an access point, a relay node, a remote radio head (RRH), a radio unit (RU), or a small cell.

That is, in this specification, the base station or the cell needs to be interpreted as a comprehensive meaning indicating a partial area or function covered by a base station controller (BSC) in the CDMA, a Node-B of WCDMA, or an eNB or a sector (site) in an LTE and is a meaning including all various coverage areas such as a megacell, a macrocell, a microcell, a picocell, a femtocell, a relay node, an RRH, an RU, and a small cell communication range.

In various cells listed above, there is a base station which controls each cell, so that the base station may be interpreted by two meanings. First, the base station may be a device itself which provides a megacell, a macrocell, a microcell, a picocell, a femtocell, or a small cell in relation to the wireless area or second, the base station may indicate the wireless area itself. According to the first meaning, when devices which provide a predetermined wireless area are controlled by the same entity or interact to configure the wireless area in cooperation with each other, all the device are indicated as a base station. Depending on a configuring method of a wireless area, eNB, RRH, an antenna, RU, LPN, a point, a transmission/reception point, a transmission point, and a reception point may be examples of the base station. According to the second meaning, the wireless area in which a signal is transmitted or received by a user terminal or a neighboring base station may be indicated as a base station.

Therefore, the megacell, the macrocell, the microcell, the picocell, the femtocell, the small cell, the RRH, the antenna, the RU, the low power node (LPN), the point, the eB, the transmission/reception point, the transmission point, and the reception point are collectively referred to as a base station.

In this specification, the user terminal and the base station are used as a comprehensive meaning as two transmission and reception subjects used to implement a technique or a technical idea described in this specification, but is not limited by a term or a word which is specifically referred to. The user terminal and the base station are used as a comprehensive meaning as two (uplink or downlink) transmission and reception subjects used to implement a technique or a technical idea described in this specification, but is not limited by a term or a word which is specifically referred to. Here, the uplink (UL) means a method for transmitting and receiving data to the base station by a user terminal and the downlink (DL) means a method for transmitting and receiving data to the user terminal by the base station.

There is no limitation on multiple access technique which is applied to a wireless communication system. Various multiple access techniques may be used, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA. An exemplary embodiment of the present disclosure may be applied to resource allocation such as asynchronous wireless communication which evolves into LTE and LTE-advanced through GSM, WCDMA, and HSPA and synchronous wireless communication which evolves into CDMA, CDMA-2000, and UMB. The present disclosure should not be interpreted to be restricted or limited to a specific wireless communication field and should be interpreted to include all technical fields to which a spirit of the present disclosure is applicable.

Herein, a time division duplex (TDD) technique performs transmission by different times may, and a frequency division duplex (FDD) technique performs transmission by using different frequencies. Such a TDD technique or the FDD technique may be used for uplink transmission and downlink transmission.

Further, in a system such as LTE or LTE-advanced, the uplink and the downlink are configured with respect to one carrier wave or carrier wave pair to configure a specification. The uplink and the downlink transmit control information through a control channel such as a physical downlink control channel (PDCCH), a physical control format indicator channel (PCFICH), a physical hybrid ARQ indicator channel (PHICH), a physical uplink control channel (PUCCH), or an enhanced physical downlink control channel (EPDCCH) and are configured by a data channel such as a physical downlink shared channel (PDSCH) or a physical uplink shared channel (PUSCH) to transmit data.

In the meantime, the control information may be transmitted also using enhanced PDCCH or extended PDCCH (EPDCCH).

In this specification, the cell may refer to a component carrier which has a coverage of a signal transmitted from a transmission/reception point or a coverage of a signal transmitted from a transmission/reception point (a transmission point or a transmission/reception point), or a transmission/reception point itself.

The wireless communication system to which the exemplary embodiments are applied may be a coordinated multi-point transmission/reception system (CoMP system), a coordinated multi-antenna transmission system, or a coordinated multi-cell communication system in which two or more transmission/reception points cooperate to transmit a signal. The CoMP system may include at least two multiple transmission/reception points and terminals.

The multiple transmission/reception point may be a base station or a macro cell (hereinafter, referred to as an 'eNB') and at least one RRH which is connected to the eNB by an optical cable or an optical fiber to be wirely controlled and has a high transmission power or low transmission power in the macro cell area.

Hereinafter, the downlink refers to communication or a communication channel from the multiple transmission/reception point to the terminal and the uplink refers to communication or a communication channel from the terminal to the multiple transmission/reception point. A transmitter in the downlink may be a part of the multiple transmission/reception point and a receiver may be a part of the terminal. In the uplink, a transmitter may be a part of the terminal and a receiver may be a part of multiple transmission/reception point.

Hereinafter, a situation in which a signal is transmitted or received through a channel such as PUCCH, PUSCH, PDCCH, EPDCCH, and PDSCH may be described that PUCCH, PUSCH, PDCCH, EPDCCH, and PDSCH are transmitted or received.

Further, hereinafter, a description that PDCCH is transmitted or received or a signal is transmitted or received through PDCCH may also mean that EPDCCH is transmitted or received or a signal is transmitted or received through EPDCCH.

That is, a physical downlink control channel which will be described below may refer to PDCCH or EPDCCH or may be used as a meaning including both PDCCH and EPDCCH.

Further, for the convenience of description, EPDCCH which is an exemplary embodiment of the present disclosure may be applied to a portion described as PDCCH and PDCCH may also be applied to a portion described as EPDCCH, as an exemplary embodiment of the present disclosure.

In the meantime, high layer signaling which will be described below includes RRC signaling which transmits RRC information including an RRC parameter.

eNB performs downlink transmission to the terminals. eNB may transmit a physical downlink shared channel (PDSCH) which is a main physical channel for unicast transmission and a physical downlink control channel (PDCCH) for transmitting downlink control information such as scheduling required to receive PDSCH and scheduling approval information for transmission in an uplink data channel (for example, a physical uplink shared channel (PUSCH)). Hereinafter, when the signal is transmitted/received through each channel, it is described that the corresponding channel is transmitted or received.

[Rel-13 BL/CE UEs for MTC Operation]

As a LTE network spreads, a mobile communication service provider wants to minimize a number of radio access terminals (RATs) to reduce a network maintenance cost. However, a GSM/GPRS network based MTC products of the related art are increased and the MTC which uses a low data transmission rate may be provided at a low cost. Therefore, the mobile communication service provider uses an LTE network for general data transmission and a GSM/GPRS network for MTC so that two RATs are individually operated, which is an inefficient utilization of a frequency band and may be a burden on the profit of the mobile communication service provider. Therefore, in order to reduce a unit price of a terminal as compared with an existing normal LTE terminal, in consideration of an MTC application scenario such as a bandwidth reduced low complexity (BL) UE in which a transmission/reception bandwidth of the terminal is limited to six PRBs (physical resource blocks) and the number of transmission/reception antennae is limited to one or smart metering installed in a 'deep indoor' environment such as a basement, a coverage enhancement (CE) mode is defined as a CE UE and a standard technology for supporting the BL/CE UE is defined in LTE rel-13 system.

[CE Mode Definition]

In the LTE Release-13 system, as a coverage enhancement mode for a BL/CE terminal, CEModeA and CEModeB are defined. The CEModeA is a terminal operation mode in which repetition for a wireless channel such as MPDCCH, PDSCH, PUSCH, and PUCCH for coverage enhancement of the BL/CE terminal is not applied or a reduced number of repetitions are applied. The CEModeB is a terminal operation mode in which a large number of repetitions are applied to the wireless channels for coverage enhancement. The CEmode is defined to be set for every terminal to perform signaling.

[Narrowband Definition]

As described above, in the case of Rel-13 BL/CE terminal, regardless of the system bandwidth, transmission/reception is performed only for 1.4 MHz (that is, 6 PRBs) through an arbitrary subframe. By doing this, a transmission/reception band of an arbitrary BL/CE terminal is defined in an arbitrary up/downlink subframe and a narrowband configured by six consecutive PRBs is defined as a unit for allocation thereof. Further, depending on each system bandwidth, $$NB_{whole} = \left\lfloor \frac{N_{RB}^{DL}}{6} \right\rfloor$$

downlink narrowbands and $$NB_{whole} = \left\lfloor \frac{N_{RB}^{DL}}{6} \right\rfloor$$

uplink narrowbands are configured. When the narrowband is configured in the arbitrary system bandwidth, a remaining RB(s) corresponding to a remainder obtained by dividing the total number of PRBs which configure the system bandwidth by 6 is evenly located at both band edges of the system band (when the system bandwidth is configured by an even number of PRBs) or located at a center of the system band (when the system band is configured by 25 PRBs), or located at both edges and the center of the system band (when the system band is 15 PRBs and 75 PRBs) and six consecutive PRBs are grouped by increasing PRB number using the remaining PRBs to configure the narrowband.

A narrowband configuring method which is specifically defined in TS36.211 document is as follows:
[TS36.211 v13.2.0]
[Downlink Narrowbands]
6.2.7 Narrowbands A narrowband is defined as six non-overlapping consecutive physical resource blocks in the frequency domain. The total number of downlink narrowbands in the downlink transmission bandwidth configured in the cell is given by $$N_{NB}^{DL} = \left\lfloor \frac{N_{RB}^{DL}}{6} \right\rfloor$$

The narrowbands are numbered $n_{NB}=0, \ldots, N_{NB}^{DL}-1$ in order of increasing physical resource-block number where narrowband $n_{NB}$ is composed of physical resource-block indices $$\begin{cases} 6n_{NB} + i_0 + i & \text{if } N_{RB}^{DL} \bmod 2 = 0 \\ 6n_{NB} + i_0 + i & \text{if } N_{RB}^{DL} \bmod 2 = 1 \text{ and } n_{NB} < N_{NB}^{DL}/2 \\ 6n_{NB} + i_0 + i + 1 & \text{if } N_{RB}^{DL} \bmod 2 = 1 \text{ and } n_{NB} \geq N_{NB}^{DL}/2 \end{cases}$$

where $i = 0, 1, \ldots, 5$ $$i_0 = \left\lfloor \frac{N_{RB}^{DL}}{2} \right\rfloor - \frac{6N_{NB}^{DL}}{2}$$

[Uplink Narrowbands]
5.2.4 Narrowbands

A narrowband is defined as six non-overlapping consecutive physical resource blocks in the frequency domain. The total number of uplink narrowbands in the uplink transmission bandwidth configured in the cell is given by $$N_{NB}^{UL} = \left\lfloor \frac{N_{RB}^{UL}}{6} \right\rfloor$$

The narrowbands are numbered $n_{NB}=0, \ldots, N_{NB}^{UL}-1$ in order of increasing physical resource-block number where narrowband $n_{NB}$ is composed of physical resource-block indices $$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2 \\ 6n_{NB} + i_0 + i + 1 & \text{if } N_{RB}^{UL} \bmod 2 = 1 \text{ and } n_{NB} \geq N_{NB}^{UL}/2 \end{cases}$$

where $i = 0, 1, \ldots, 5$ $$i_0 = \left\lfloor \frac{N_{RB}^{UL}}{2} \right\rfloor - \frac{6N_{NB}^{UL}}{2}$$

[Resource Allocation and DCI Format for BL/CE UE]

According to the PDSCH and PUSCH resource allocation method for the BL/CE terminal defined in Rel-13, when an arbitrary base station configures DCI including PDSCH or PUSCH resource allocation information for an arbitrary BL/CE terminal, PDSCH or PUSCH transmission for the BL/CE terminal is defined to include narrow index information for PRB (or VRB) allocation and RB allocation information in the corresponding narrowband. Further, the RB allocation information in the corresponding narrowband is configured in a consecutive VRB resource allocating manner. Therefore, the PDSCH is defined to be configured based on a resource allocation type 2, and PUSCH is defined to be configured based on a resource allocation type 0. However, in the case of PUSCH, only for a BL/CE terminal set in CEModeB, the resource may be allocated based on the resource allocation type 2.

A specific resource allocating method and a DCI format for a BL/CE defined thereby are described in TS36.213 and TS36.212, as below.
[TS36.213 v13.2.0]
DL resource allocation
7.1.6.3 Resource Allocation Type 2

For BL/CE UEs with resource allocation type 2 resource assignment, $N_{RB}^{DL}=6$ and $N_{VRB}^{DL}=6$ are used in the rest of this subclause.

In resource allocations of type 2, the resource block assignment information indicates, to a scheduled UE, a set of contiguously allocated localized virtual resource blocks or distributed virtual resource blocks. In case of resource allocation signalled with PDCCH DCI format 1A, 1B or 1D, or for resource allocation signalled with EPDCCH DCI format 1A, 1B, or 1D, one bit flag indicates whether localized virtual resource blocks or distributed virtual resource blocks are assigned (value 0 indicates Localized and value 1 indicates Distributed VRB assignment) while distributed virtual resource blocks are always assigned in case of resource allocation signalled with PDCCH DCI format 1C. Localized VRB allocations for a UE vary from a single VRB up to a maximum number of VRBs spanning the system bandwidth. For DCI format 1A the distributed VRB allocations for a UE vary from a single VRB up to $N_{VRB}^{DL}$ VRBs, where $N_{VRB}^{DL}$ is defined in [3], if the DCI CRC is scrambled by P-RNTI, RA-RNTI, or SI-RNTI. With PDCCH DCI format 1B, 1D with a CRC scrambled by C-RNTI, or with DCI format 1A with a CRC scrambled with C-RNTI, SPS C-RNTI or Temporary C-RNTI distributed VRB allocations for a UE vary from a single VRB up to $N_{VRB}^{DL}$ VRBs if $N_{RB}^{DL}$ is 6-49 and vary from a single VRB up to 16 if $N_{RB}^{DL}$ is 50-110. With EPDCCH DCI format 1B, 1D with a CRC scrambled by C-RNTI, or with DCI format 1A with a CRC scrambled with C-RNTI, SPS C-RNTI distributed VRB allocations for a UE vary from a single VRB up to $N_{VRB}^{DL}$ VRBs if $N_{RB}^{DL}$ is 6-49 and vary from a single VRB up to 16 if $N_{RB}^{DL}$ is 50-110. With PDCCH DCI format 1C, distributed VRB allocations for a UE vary from $N_{RB}^{step}$ VRB(s) up to $\lfloor N_{VRB}^{DL}/N_{RB}^{step} \rfloor \cdot N_{RB}^{step}$ VRBs with an increment step of $N_{RB}^{step}$, where $N_{RB}^{step}$ value is determined depending on the downlink system bandwidth as shown in Table 7.1.6.3-1 in FIG. 1.

For PDCCH DCI format 1A, 1B or 1D, for EPDCCH DCI format 1A, 1B, or 1D, or for MPDCCH DCI format 6-1A, a type 2 resource allocation field consists of a resource indication value (RIV) corresponding to a starting resource block ($RB_{start}$) and a length in terms of virtually contiguously allocated resource blocks $L_{CRBs}$. The resource indication value is defined by if $(L_{CRBs}-1) \leq \lfloor N_{RB}^{DL}/2 \rfloor$ then $$RIV = N_{RB}^{DL}(L_{CRBs}-1) + RB_{start}$$

else $$RIV = N_{RB}^{DL}(N_{RB}^{DL} - L_{CRBs}+1) + (N_{RB}^{DL}-1-RB_{start})$$

where $L_{CRBs \geq 1}$ and shall not exceed $N_{VRB}^{DL} - RB_{start}$.

For PDCCH DCI format 1C, a type 2 resource block assignment field consists of a resource indication value (RIV) corresponding to a starting resource block ($RB_{start}=0$, $N_{RB}^{step}, 2N_{RB}^{step}, \ldots, (\lfloor N_{VRB}^{DL}/N_{RB}^{step} \rfloor - 1)N_{RB}^{step}$) and a length in terms of virtually contiguously allocated resource blocks ($L_{CRBs}=, N_{RB}^{step} 2N_{RB}^{step}, \ldots, \lfloor N_{VRB}^{DL}/N_{RB}^{step} \rfloor \cdot N_{RB}^{step}$). The resource indication value is defined by:

if $(L_{CRBs}'-1) \leq \lfloor N_{VRB}^{\prime DL}/2 \rfloor$ then $$RIV = N_{VRB}^{\prime DL}(L_{CRBs}'-1) + RB_{start}'$$

else $$RIV = N_{VRB}^{\prime DL}(N_{VRB}^{\prime DL} - L_{CRBs}'+1) + (N_{VRB}^{\prime DL} - 1 - RB_{start}')$$

where $L_{CRBs}' = L_{CRBs}/N_{RB}^{step}$. $RB_{start}' = RB_{start}/N_{RB}^{step}$ and $N_{VRB}^{\prime DL} = \lfloor N_{VRB}^{DL}/N_{RB}^{step} \rfloor$. Here $L_{CRBs}' > 1$ and shall not exceed $N_{VRB}^{\prime DL} - RB_{start}'$.

UL Resource Allocation 8.1.1 Uplink Resource Allocation Type 0

The resource allocation information for uplink resource allocation type 0 indicates, to a scheduled UE, a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \geq 1$). For a BL/CE UE, uplink resource allocation type 0 is only applicable for UE configured with CEModeA and $N_{RB}^{UL}=6$ in this subclause. The resource indication value is defined by if $(L_{CRBs}-1) \leq \lfloor N_{RB}^{UL}/2 \rfloor$ then $$RIV = N_{RB}^{UL}(L_{CRBs}-1) + RB_{START}$$

else $$RIV = N_{RB}^{UL}(N_{RB}^{UL} - L_{CRBs}+1) + (N_{RB}^{UL}-1-RB^{START})$$

8.1.3 Uplink Resource Allocation Type 2

Uplink resource allocation type 2 is only applicable for BL/CE UE configured with CEModeB. The resource allocation information for uplink resource allocation type 2 indicates, to a scheduled UE, a set of contiguously allocated resource blocks within a narrowband as given in Table 8.1.3-1 in FIG. 2.

[TS36.212 v13.2.0]

DCI Formats for BL/CE UEs 5.3.3.1.10 Format 6-0A

DCI format 6-0A is used for the scheduling of PUSCH in one UL cell.

The following information is transmitted by means of the DCI format 6-0A:

Flag format 6-0A/format 6-1A differentiation—1 bit, where value 0 indicates format 6-0A and value 1 indicates format 6-1A Frequency hopping flag—1 bit, where value 0 indicates frequency hopping is not enabled and value 1 indicates frequency hopping is enabled as defined in section 5.3.4 of [2]

Resource block assignment—

$$\left\lceil \log_2 \left\lfloor \frac{N_{RB}^{UL}}{6} \right\rfloor \right\rceil + 5 \text{ bits}$$

for PUSCH as defined in [3]:

$$\left\lceil \log_2 \left\lfloor \frac{N_{RB}^{UL}}{6} \right\rfloor \right\rceil$$

MSB bits provide the narrowband index as defined in section 5.2.4 of [2]

5 bits provide the resource allocation using UL resource allocation type 0 within the indicated narrowband Modulation and coding scheme—4 bits as defined in section 8.6 of [3]

Repetition number—2 bits as defined in section 8.0 of [3]

HARQ process number—3 bits

New data indicator—1 bit

Redundancy version—2 bits

TPC command for scheduled PUSCH—2 bits as defined in section 5.1.1.1 of [3]

UL index—2 bits as defined in sections 5.1.1.1, 7.2.1, 8 and 8.4 of [3] (this field is present only for TDD operation with uplink-downlink configuration 0)

Downlink Assignment Index (DAI)—2 bits as defined in section 7.3 of [3] (This field is present only for cases with TDD primary cell and either TDD operation with uplink-downlink configurations 1-6 or FDD operation. This field is reserved when the configured maximum repetition number is larger than 1 for either PDSCH or MPDCCH.)

CSI request—1 bit as defined in section 7.2.1 of [3]

SRS request—1 bit. The interpretation of this field is provided in section 8.2 of [3]

DCI subframe repetition number—2 bits as defined in section 9.1.5 of [3]

If the number of information bits in format 6-0A mapped onto a given search space is less than the payload size of format 6-1A for scheduling the same serving cell and mapped onto the same search space (including any padding bits appended to format 6-1A), zeros shall be appended to format 6-0A until the payload size equals that of format 6-1A.

5.3.3.1.11 Format 6-0B

DCI format 6-0B is used for the scheduling of PUSCH in one UL cell.

The following information is transmitted by means of the DCI format 6-0B:

Flag for format 6-0B/format 6-1B differentiation—1 bit, where value 0 indicates format 6-0B and value 1 indicates format 6-1B Resource block assignment—

$$\left\lceil \log_2 \left\lfloor \frac{N_{RB}^{UL}}{6} \right\rfloor \right\rceil + 3 \text{ bits}$$

for PUSCH as defined in [3]:

$$\left\lceil \log_2 \left\lfloor \frac{N_{RB}^{UL}}{6} \right\rfloor \right\rceil$$

MSB bits provide the narrowband index as defined in section 5.2.4 of [2]

3 bits provide the resource allocation within the indicated narrowband as specified in section 8.1.3 of [3]

Modulation and coding scheme—4 bits as defined in section 8.6 of [3]

Repetition number—3 bits as defined in section 8.0 of [3]

HARQ process number—1 bit

New data indicator—1 bit

DCI subframe repetition number—2 bits as defined in section 9.1.5 of [3]

If the number of information bits in format 6-0B mapped onto a given search space is less than the payload size of format 6-1B for scheduling the same serving cell and mapped onto the same search space (including any padding bits appended to format 6-1B), zeros shall be appended to format 6-0B until the payload size equals that of format 6-1B.

5.3.3.1.12 Format 6-1A

DCI format 6-1A is used for the compact scheduling of one PDSCH codeword in one cell and random access procedure initiated by a PDCCH order. The DCI corresponding to a PDCCH order can be carried by MPDCCH.

The following information is transmitted by means of the DCI format 6-1A:

Flag format 6-0A/format 6-1A differentiation—1 bit, where value 0 indicates format 6-0A and value 1 indicates format 6-1A.

Format 6-1A is used for random access procedure initiated by a PDCCH order only if format 6-1A CRC is scrambled with C-RNTI and all the remaining fields are set as follows:

Resource block assignment—

$$\left\lceil \log_2 \left\lfloor \frac{N_{RB}^{DL}}{6} \right\rfloor \right\rceil + 5 \text{ bits,}$$

where all bits shall be set to 1

Preamble Index—6 bits

PRACH Mask Index—4 bits, [5]

Starting CE level—2 bits provide the PRACH starting CE level as defined in [5]

All the remaining bits in format 6-1A for compact scheduling assignment of one PDSCH codeword are set to zero Otherwise, Frequency hopping flag—1 bit, where value 0 indicates frequency hopping is not enabled and value 1 indicates frequency hopping is enabled as defined in section 6.4.1 of [2]

Resource block assignment—

$$\left\lceil \log_2 \left\lfloor \frac{N_{RB}^{DL}}{6} \right\rfloor \right\rceil + 5 \text{ bits}$$

for PDSCH as defined in [3]:

$$\left\lceil \log_2 \left\lfloor \frac{N_{RB}^{DL}}{6} \right\rfloor \right\rceil$$

MSB bits provide the narrowband index as defined in section 6.2.7 of [2]

5 bits provide the resource allocation using DL resource allocation type 2 within the indicated narrowband Modulation and coding scheme—4 bits as defined in section 7.1.7 of [3]

Repetition number—2 bits as defined in section 7.1.11 of [3]

HARQ process number—3 bits (for cases with FDD primary cell), 4 bits (for cases with TDD primary cell)

New data indicator—1 bit

Redundancy version—2 bits

TPC command for PUCCH—2 bits as defined in section 5.1.2.1 of [3]

If the format 6-1A CRC is scrambled by RA-RNTI:

The most significant bit of the TPC command is reserved.

The least significant bit of the TPC command indicates column $N_{PRB}^{1A}$ of the TBS table defined of [3].

If least significant bit is 0 then $N_{PRB}^{1A}=2$ else $N_{PRB}^{1A}=3$.

Else

The two bits including the most significant bit indicate the TPC command

Downlink Assignment Index—number of bits as specified in Table 5.3.3.1.2-2. This field is reserved when the configured maximum repetition number is larger than 1 for either PDSCH or MPDCCH.

Antenna port(s) and scrambling identity—2 bits indicating the values 0 to 3, as specified in Table 5.3.3.1.5C-1. This field is present only if PDSCH transmission is configured with TM9.

SRS request—1 bit. The interpretation of this field is provided in section 8.2 of [3]

TPMI information for precoding—number of bits as specified in Table 5.3.3.1.3A-1.

TPMI information indicates which codebook index is used in Table 6.3.4.2.3-1 or Table 6.3.4.2.3-2 of [2] corresponding to the single-layer transmission. This field is present only if PDSCH transmission is configured with TM6.

PMI confirmation for precoding—1 bit as specified in Table 5.3.3.1.3A-2. This field is present only if PDSCH transmission is configured with TM6.

HARQ-ACK resource offset—2 bits as defined in section 10.1 of [3]

DCI subframe repetition number—2 bits as defined in section 9.1.5 of [3]

When the format 6-1A CRC is scrambled with a RA-RNTI, then the following fields among the fields above are reserved:

HARQ process number
New data indicator
Downlink Assignment Index
HARQ-ACK resource offset If the UE is not configured to decode MPDCCH with CRC scrambled by the C-RNTI, and if the number of information bits in format 6-1A is less than that of format 6-0A, zeros shall be appended to format 6-1A until the payload size equals that of format 6-0A.

If the UE is configured to decode MPDCCH with CRC scrambled by the C-RNTI, and if the number of information bits in format 6-1A mapped onto a given search space is less than that of format 6-0A for scheduling the same serving cell and mapped onto the same search space, zeros shall be appended to format 6-1A until the payload size equals that of format 6-0A.

5.3.3.1.13 Format 6-1B

DCI format 6-1B is used for the scheduling of one PDSCH codeword in one cell.

The following information is transmitted by means of the DCI format 6-1B:

Flag for format 6-0B/format 6-1B differentiation—1 bit, where value 0 indicates format 6-0B and value 1 indicates format 6-1B Format 6-1B is used for random access procedure initiated by a PDCCH order only if format 6-1B CRC is scrambled with C-RNTI and all the remaining fields are set as follows:

Reserved bits—

$$\left\lceil \log_2 \left\lfloor \frac{N_{RB}^{DL}}{6} \right\rfloor \right\rceil + 2 \text{ bits,}$$

where all bits shall be set to 1
Preamble Index—6 bits
PRACH Mask Index—4 bits [5]
Starting CE level—2 bits provide the PRACH starting CE level as defined in [5]
All the remaining bits in format 6-1B for compact scheduling assignment of one PDSCH codeword are set to zero
Otherwise,
Modulation and coding scheme—4 bits as defined in section 7.1.7 of [3]
Resource block assignment—

$$\left\lceil \log_2 \left\lfloor \frac{N_{RB}^{DL}}{6} \right\rfloor \right\rceil + 1 \text{ bits}$$

for PDSCH as defined in [3]:

$$\left\lceil \log_2 \left\lfloor \frac{N_{RB}^{DL}}{6} \right\rfloor \right\rceil$$

MSB bits provide the narrowband index as defined in section 6.2.7 of [2]
1 bit provides the resource allocation within the indicated narrowband, where value 0 indicates RBs with PRB index {0, 1, 2, 3} and value 1 indicates that all 6 PRBs are used.
Repetition number—3 bits as defined in section 7.1.11 of [3]
HARQ process number—1 bit
New data indicator—1 bit
HARQ-ACK resource offset—2 bits as defined in section 10.1 of [3]
DCI subframe repetition number—2 bits as defined in section 9.1.5 of [3]

When the format 6-1B CRC is scrambled with a RA-RNTI, the following fields among the fields above are reserved:
HARQ process number
New data indicator
HARQ-ACK resource offset If the UE is not configured to decode MPDCCH with CRC scrambled by the C-RNTI, and if the number of information bits in format 6-1B is less than that of format 6-0B, zeros shall be appended to format 6-1B until the payload size equals that of format 6-0B.

If the UE is configured to decode MPDCCH with CRC scrambled by the C-RNTI, and if the number of information bits in format 6-1B mapped onto a given search space is less than that of format 6-0B for scheduling the same serving cell and mapped onto the same search space, zeros shall be appended to format 6-1B until the payload size equals that of format 6-0B.

5.3.3.1.14 Format 6-2

DCI format 6-2 is used for paging and direct indication.
The following information is transmitted by means of the DCI format 6-2:

Flag for paging/direct indication differentiation—1 bit, with value 0 for direct indication and value 1 for paging
If Flag=0:
Direct Indication information—8 bits provide direct indication of system information update and other fields, as defined in [6]
Reserved information bits are added until the size is equal to that of format 6-2 with Flag=1
If Flag=1:
Resource block assignment—

$$\left\lceil \log_2 \left\lfloor \frac{N_{RB}^{DL}}{6} \right\rfloor \right\rceil \text{ bits}$$

for the narrowband index as defined in section 7.1.6 of [3]
Modulation and coding scheme—3 bits as defined in section 7.1.7 of [3]
Repetition number—3 bits as defined in section 7.1.11 of [3]
DCI subframe repetition number—2 bits as defined in section 9.1.5 of [3]

[MPDCCH Search Space Configuration]

As an MPDCCH search space for an Rel-13 BL/CE terminal, four search spaces are defined. Four search spaces includes i) a type-0 common search space which is defined to monitor only when a mode is set to be CEModeA, ii) a type-1 common search space for paging, iii) a type-2 common search space for a random access procedure, and iv) a UE-specific search space for terminal specified data transmission and reception.

A specific MPDCCH search space configuration is described in TS36.213 document as below.

[T536.213]

9.1.5 MPDCCH Assignment Procedure

A BL/CE UE shall monitor a set of MPDCCH candidates on one or more Narrowbands (described in subclause 5.2.4 of [3]) as configured by higher layer signalling for control information, where monitoring implies attempting to decode each of the MPDCCHs in the set according to all the monitored DCI formats. The Narrowband in a subframe used for MPDCCH monitoring is determined as described in [3].

A UE that is not a BL/CE UE is not required to monitor MPDCCH.

Higher layer signalling can configure a BL/CE UE with one or two MPDCCH-PRB-sets for MPDCCH monitoring. The PRB-pairs corresponding to an MPDCCH-PRB-set are indicated by higher layers. Each MPDCCH-PRB-set consists of set of ECCEs numbered from 0 to $N'_{ECCE,p,k}-1$ where $N'_{ECCE,p,k}$ is the number of ECCEs in MPDCCH-PRB-set p of subframe k.

The MPDCCH-PRB-set(s) can be configured by higher layers for either localized MPDCCH transmission or distributed MPDCCH transmission.

The set of MPDCCH candidates to monitor are defined in terms of MPDCCH search spaces.

The BL/CE UE shall monitor one or more of the following search spaces
 a Type0-MPDCCH common search space if configured with CEmodeA,
 a Type1-MPDCCH common search space,
 a Type2-MPDCCH common search space, and
 a MPDCCH UE-specific search space.

A BL/CE UE configured with CEModeB is not required to monitor Type0-MPDCCH common search space.

The BL/CE UE is not required to simultaneously monitor MPDCCH UE-specific search space and Type1-MPDCCH common search space.

The BL/CE UE is not required to simultaneously monitor MPDCCH UE-specific search space and Type2-MPDCCH common search space.

A BL/CE UE is not expected to monitor an MPDCCH candidate, if an ECCE corresponding to that MPDCCH candidate is mapped to a PRB pair that overlaps with a transmission of PDSCH scheduled previously in the same subframe. For aggregation level L'=24 or L'=12 ECCEs, the number of ECCEs refers to the MPDCCH mapping to the REs of the 2+4 PRB set as defined in [3]. An MPDCCH search space $MS_k^{(L',R)}$ at aggregation level L'∈{1,2,4,8,16, 12,24} and repetition level R∈{1,2,4,8,16,32,64,128,256} is defined by a set of MPDCCH candidates where each candidate is repeated in a set of R consecutive BL/CE downlink subframes starting with subframe k. For an MPDCCH-PRB-set p, the ECCEs corresponding to MPDCCH candidate m of the search space $MS_k^{(L',R)}$ are given by $$L\left\{\left(Y_{p,k}+\left\lfloor\frac{m\cdot N'_{ECCE,p,k}}{L\cdot M_p'^{(L')}}\right\rfloor\right)\mod\lfloor N'_{ECCE,p,k}/L'\rfloor\right\}+i$$

where $i = 0, \ldots, L'-1$ $m = 0, 1, \ldots, M_p'^{(L')} - 1$.

$M_p'^{(L')}$ is the number of MPDCCH candidates to monitor at aggregation level L' in MPDCCH-PRB-set p in each subframe in the set of R consecutive subframes.

$Y_{p,k}$ for MPDCCH UE-specific search space is determined as described in subclause 9.1.4, and $Y_{p,k}=0$ for Type0-MPDCCH common search space, Type1-MPDCCH common search space and Type2-MPDCCH common search space.

A BL/CE UE is not expected to monitor MPDCCH in subframes that are not BL/CE DL subframes.

Until BL/CE UE receives higher layer configuration of MPDCCH UE-specific search space, the BL/CE UE monitors MPDCCH according to the same configuration of MPDCCH search space and Narrowband as that for MPDCCH scheduling Msg4.

The aggregation and repetition levels defining the MPDCCH search spaces and the number of monitored MPDCCH candidates are given as follows:
 For MPDCCH UE-specific search space
  if the BL/CE UE is configured with $N'_{RB}{}^{X_p}=2$ or $N'_{RB}{}^{X_p}=4$ PRB-pairs, and mPDCCH-NumRepetition=1, and
  if the MPDCCH-PRB-set is configured for distributed transmission, the aggregation levels defining the search spaces and the number of monitored MPDCCH candidates are listed in Table 9.1.4-1a and Table 9.1.4-1b, where L is substituted with L' for L≤24, and $N_{RB}{}^{X_p}$ is substituted with $N'_{RB}{}^{X_p}$,
  if the MPDCCH-PRB-set is configured for localized transmission, the aggregation levels defining the search spaces and the number of monitored MPDCCH candidates are listed in Table 9.1.4-2a and Table 9.1.4-2b, where L is substituted with L' and $N_{RB}{}^{X_p}$ is substituted with $N'_{RB}{}^{X_p}$,
  otherwise
  if the UE is configured with CEModeA, and $N'_{RB}{}^{X_p}=2$ or $N'_{RB}{}^{X_p}=4$, the aggregation and repetition levels defining the search spaces and the number of monitored MPDCCH candidates are listed in Table 9.1.5-1a in FIG. 3
  if the UE is configured with CEModeA, and $N'_{RB}{}^{X_p}=2+4$, the aggregation and repetition levels defining the search spaces and the number of monitored MPDCCH candidates are listed in Table 9.1.5-1b in FIG. 4
  if the UE is configured with CEModeB, and $N'_{RB}{}^{X_p}=2$ or $N'_{RB}{}^{X_p}=4$, the aggregation and repetition levels defining the search spaces and the number of monitored MPDCCH candidates are listed in Table 9.1.5-2a in FIG. 5
  if the UE is configured with CEModeB, and $N'_{RB}{}^{X_p}=2+4$, the aggregation and repetition levels defining the search spaces and the number of monitored MPDCCH candidates are listed in Table 9.1.5-2b in FIG. 6

$N'_{RB}{}^{X_p}$ is the number of PRB-pairs configured for MPDCCH UE-specific search space. When $N'_{RB}{}^{X_p}=2+4$, it is given by the higher layer parameter numberPRB-Pairs-r13, and when $N'_{RB}{}^{X_p}=2$ or $N'_{RB}{}^{X_p}=4$, it is given by the higher layer parameter numberPRB-Pairs-r11.

r1, r2, r3, r4 are determined from Table 9.1.5-3 in FIG. 7 by substituting the value of $r_{max}$ with the value of higher layer parameter mPDCCH-NumRepetition.

The PRB-pairs within a Narrowband corresponding to an MPDCCH-PRB-set are indicated by higher layers and are determined using the description given in subclause 9.1.4.4.

If higher layer configuration numberPRB-Pairs-r13 for MPDCCH-PRB-set p is 6, $N'_{RB}{}^{X_p}=2+4$, and the number of PRB-pairs in an MPDCCH-PRB-set p=2+4.

If Type2-MPDCCH common search space,
 PRB-pairs of the 2 PRB set in the 2+4 PRB set correspond to PRB-pairs with the largest two PRB indices in MPDCCH-PRB-set p.
 PRB-pairs of the 4 PRB set in the 2+4 PRB set correspond to PRB-pairs with the smallest 4 PRB indices in MPDCCH-PRB-set p.
 PRB-pairs of the 2+4 PRB set in the 2+4 PRB set correspond to all PRB-pairs in MPDCCH-PRB-set p
For Type0-MPDCCH common search space, the narrowband location and the MPDCCH-PRB-set p are the same as for MPDCCH UE-specific search space, and
 if $N'_{RB}{}^{X_p}=2$.

$M'^{(L')}_p=1$ for $L'_x$ and repetition levels r1, r2, r3, r4 given in Table 9.1.5.-3 in FIG. 7. For all other cases, $M'^{(L')}_p=0$ if $N'_{RB}{}^{X_p}=4$, $M'^{(L')}_p=1$ for $L'=16$ and repetition levels r1, r2, r3, r4 given in Table 9.1.5.-3 in FIG. 7. For all other cases, $M'^{(L')}_p=0$ if $N'_{RB}{}^{X_p}=2+4$, $M'^{(L')}_p=1$ for $L'=24$ and repetition levels r1, r2, r3, r4 given in Table 9.1.5.-3 in FIG. 7. For all other cases, $M'^{(L')}_p=0$ For Type1-MPDCCH common search space, the number of PRB-pairs in MPDCCH-PRB-set p is 2+4 PRB-pairs, and $M'^{(L')}_p=1$ for $L'=24$ and repetition levels r1, r2, r3, r4 where the repetition levels are determined from Table 9.1.5-4 in FIG. 8 by substituting the value of $r_{max}$ with higher layer parameter mPDCCH-NumRepetition-Paging.

For all other cases, $M'^{(L')}_p=0$

For Type2-MPDCCH common search space, the number of PRB-pairs in MPDCCH-PRB-set p is 2+4 PRB-pairs, and If the most recent coverage enhancement level used for PRACH is coverage enhancement level 0 and 1, the aggregation and repetition levels defining the search spaces and the number of monitored MPDCCH candidates are determined from Table 9.1.5-1b in FIG. 4, by assuming that the number of candidates for $L'<8$ as zero.

If the most recent coverage enhancement level used for PRACH is coverage enhancement level 2 and 3, the aggregation and repetition levels defining the search spaces and the number of monitored MPDCCH candidates are determined from Table 9.1.5-2b in FIG. 6.

where r1, r2, r3, r4 are determined from Table 9.1.5-3 in FIG. 7 by substituting the value of $r_{max}$ with the value of higher layer parameter mPDCCH-NumRepetition-RA.

In tables 9.1.5-1a in FIG. 3, 9.1.5-1b in FIG. 4, 9.1.5-2a in FIG. 5, 9.1.5-2b in FIG. 6, and for Type0, Type1, Type2 MPDCCH common search space, L' is applied for $N_{EREG}{}^{ECCE}=4$, and L" is applied for $N_{EREG}{}^{ECCE}=8$ wherein $L"=L'/2$ substituting the values of L'.

For Type1-MPDCCH common search space and Type2-MPDCCH common search space, distributed MPDCCH transmission is used.

For MPDCCH UE-specific search space, Type0-common search space, and Type2-common search space locations of starting subframe k are given by $k=k_b$ where $k_b$ is the b" consecutive BL/CE DL subframe from subframe k0, and $b=u \cdot rj$, and $$u = 0, 1, \ldots \frac{r_{max}}{ri} - 1, \text{ and } j \in \{1, 2, 3, 4\},$$

where subframe k0 is a subframe satisfying the condition $(10n_f + \lfloor n_s/2 \rfloor) \bmod T=0$, where $T=r_{max} \cdot G$ For MPDCCH UE-specific search space, Type0-common search space G is given by the higher layer parameter mPDCCH-startSF-UESS, For Type2-common search space, G is given by the higher layer parameter mPDCCH-startSF-CSS-RA-r13

$r_{max}$ is given by higher layer parameter mPDCCH-NumRepetition, and r1, r2, r3, r4 are given in Table 9.1.5-3 in FIG. 7.

A BL/CE UE is not expected to be configured with values of $r_{max}$ and G that result in non-integer values of T.

For Type1-common search space, k=k0 and is determined from locations of paging opportunity subframes, If SystemInformationBlockType1-BR or SI message is transmitted in one narrowband in subframe k, a BL/CE UE shall assume MPDCCH in the same narrowband in the subframe k is dropped.

The BL/CE UE is not required to monitor an MPDCCH search space if any ECCEs corresponding to any of its MPDCCH candidates occur within a frame before $n_f=0$ and also occur within frame $n_f=0$.

For MPDCCH UE-specific search space or for Type0-common search space if the higher layer parameter mPDCCH-NumRepetition is set to 1; or for Type2-common search space if the higher layer parameter mPDCCH-NumRepetition-RA is set to 1;

The BL/CE UE is not required to monitor MPDCCH

For TDD and normal downlink CP, in special subframes for the special subframe configurations 0 and 5 shown in Table 4.2-1 of [3]

For TDD and extended downlink CP, in special subframes for the special subframe configurations 0, 4 and 7 shown in Table 4.2-1 of [3];

otherwise

The BL/CE UE is not required to monitor MPDCCH

For TDD, in special subframes, if the BL/CE UE is configured with CEModeB

For TDD and normal downlink CP, in special subframes for the special subframe configurations 0, 1, 2, 5, 6, 7 and 9 shown in Table 4.2-1 of [3], if the BL/CE UE is configured with CEModeA For TDD and extended downlink CP, in special subframes for the special subframe configurations 0, 4, 7, 8 and 9 shown in Table 4.2-1 of [3], if the BL/CE UE is configured with CEModeA.

The number of MPDCCH repetitions is indicated in the 'DCI subframe repetition number' field in the DCI according to the mapping in Table 9.1.5-5 in FIG. 9.

[Further Enhanced MTC]

As described above, additional enhanced feature for the BL/CE terminal defined in 3GPP rel-13 will be discussed in 3GPP rel-14 system, and a specific scope is described in the WID document RP-161321 as below.

[RP-161321]

3 Justification

The provision of IoT via cellular networks is proving to be a significant opportunity for mobile operators. In Release 13, two classes of low-cost IoT devices with enhanced coverage and long battery life are specified: eMTC devices and NB-IoT devices with UE bandwidths of 6 PRBs and 1 PRB, respectively (1 PRB=a 180-kHz physical resource block).

UE positioning and tracking are important in many IoT applications, such as asset tracking. But GNSS-based positioning method is not appropriate for many IoT applications. Additionally, the narrow UE bandwidth poses challenges for the positioning accuracy when using the 3GPP positioning functionalities defined for normal UEs. In Rel-13, only limited positioning functionalities are provided for these UEs. Hence completing the core requirements from Rel-13 and considering improvements of the 3GPP positioning methods are necessary to improve the 3GPP-based IoT eco-system.

When many devices in the same cell need to receive the same information simultaneously, for example in case of rollout of firmware or software upgrades, it is in many cases more efficient to use multicast transmission instead of unicast transmission. Low complexity multicast functionality can be introduced either in the form of a narrowband format of the regular MBSFN transmission functionality or as a small extension of the recently introduced single-cell point-to-multipoint transmission (SC-PtM) functionality.

In Rel-13 the requirements of complexity reduction, extended battery life, and coverage enhancements aimed at devices such as sensors, meters, smart readers, and similar. Other types of devices/use cases, such as voice capable wearable devices and health monitoring devices share some of these requirements. However, a subset of these devices are not fully covered by the Rel-13 improvements because they require higher data rates above 1 Mbps, mobility, and they may support services that are more delay sensitive. It is important to address such use cases with higher data rate requirements and with mobility compared to those addressed by Rel-13 eMTC while maximally harvesting the power consumption and complexity reduction and link budget enhancements features enabled by using the existing Rel-13 eMTC solution.

4 Objective 4.1 Objective of SI or Core Part WI or Testing Part WI

The objective is to specify the following improvements for machine-type communications for BL/CE (eMTC) UEs.

Positioning [RAN4, RAN1]

E-CID: RSRP/RSRQ measurement

E-CID: UE Rx-Tx time difference measurement

OTDOA: core requirements

From RAN#73: (considering the outcome of the NB-IoT) accuracy, UE complexity and power consumption for OTDOA can be studied Multicast [RAN2 Lead, RAN1]

Extend Rel-13 SC-PTM to support multicast downlink transmission (e.g. firmware or software updates, group message delivery)

Introduction of necessary enhancements to support narrowband operation, e.g. support of MPDCCH, and coverage enhancement, e.g. repetitions Mobility Enhancements [RAN4 Only]

Full standard support for inter-frequency measurements for eMTC [RAN4]

Higher Data Rates [RAN1, RAN2, RAN4]

Specify HARQ-ACK bundling in CE mode A in HD-FDD

Larger maximum TBS

Larger max. PDSCH/PUSCH channel bandwidth in connected mode at least in CE mode A in order to enhance support e.g. voice and audio streaming or other applications and scenarios Up to 10 DL HARQ processes in CE mode A in FD-FDD The present disclosure suggests a PDSCH/PUSCH resource allocating method for a new rel-14 MTC terminal (which will be referred to as a HeMTC terminal for the convenience of description in the present disclosure, but the present disclosure is not limited to the terminology) which supports a PDSCH/PUSCH channel bandwidth extended as compared with rel-13 BL/CE terminal and a DCI configuring method in accordance with the method.

As described above, the HeMTC terminal which requires data rates enhanced as compared with the existing rel-13 BL/CE terminal supports PDSCH and PUSCH transmission/reception bandwidth which are extended more than a narrowband defined as 6 PRBs based on a maximum transmission/reception bandwidth of the existing rel-13 BL/CE terminal. Therefore, it is difficult to reuse a resource allocating method and a DCI format for the rel-13 BL/CE terminal.

Therefore, the present disclosure suggests a PDSCH/PUSCH resource allocating method for a HeMTC terminal.

Point 1. Resource Allocation and Corresponding DCI Format for HeMTC

Method 1. Method for Allocating a Plurality of Narrowbands

As a method for allocating a PDSCH/PUSCH resource for the arbitrary HeMTC, a DCI format is defined to include information area indicating a plurality of narrowband allocation information, where the DCI format transmits a PDSCH or PUSCH resource allocation information for an arbitrary HeMTC terminal.

Specifically, the plurality of narrowband allocation information may be configured with starting narrowband index indication information, the number of narrowbands consecutively allocated from the starting narrowband index, and information indicating a K value. In this case, the starting narrowband index indication information and the number of allocated narrowbands, and information indicating a K value are defined as separate information areas to be independently set and transmitted. Alternatively, the starting narrowband index, the number of consecutively allocated narrowbands, and the K value may be defined to be deducted by a functional formula, based on a narrowband indication value when the narrowband indication value is set through one information area.

Alternatively, the K value may have an arbitrary fixed value as a function of a capability of the HeMTC terminal or as a function of a system bandwidth, or the K value may be semi-statically set through UE-specific/cell-specific RRC signaling. Further, the K value may be defined to include only indication information of the starting narrowband index through the DCI which transmits PDSCH/PUSCH resource allocation information.

As another method for allocating a plurality of narrowbands, i) a narrowband group is defined by grouping N consecutive non-overlapping narrowbands for narrowbands configured for an arbitrary system bandwidth and ii) the DCI format is configured to include information indicating the narrowband group, where the DCI format transmits resource allocation information for PDSCH and PUSCH. Such a narrowband group is also referred to as a wideband and the narrowband group indication information may be wideband indication information.

For example, when narrowbands for configuring a system bandwidth include $$N_{NB}^{DL} = \left\lfloor \frac{N_{RB}^{DL}}{6} \right\rfloor$$

narrow bands, such as #0 to #

$$\left\lfloor \frac{N_{RB}^{DL}}{6} \right\rfloor - 1$$

(or when narrowbands for uplink (UL) include #0 to $$\left\lfloor \frac{N_{RB}^{UL}}{6} \right\rfloor - 1),$$

i) a narrowband group is configured with N consecutive narrowbands of #0 to $$_{\#}\left\lfloor \frac{N_{NB}^{DL}}{N} \right\rfloor - 1$$

(or, narrowbands from #0 to $$\#\left\lfloor \frac{N_{NB}^{UL}}{N} \right\rfloor - 1$$

for the UL), and ii) it may be defined to include narrowband group index indication information which is allocated through the DCI format which transmits the PDSCH or PUSCH resource allocation information.

In this case, an N value (e.g., the number of narrowbands configuring one narrowband group) is i) determined by a function of a capability of the HeMTC terminal and a system bandwidth, ii) semi-statically set through cell-specific/UE-specific RRC signaling, or i) dynamically set through the DCI format which transmits the PDSCH/PUSCH resource allocation information.

Additionally, the DCI format for transmitting the PDSCH or PUSCH resource allocation information of the HeMTC terminal may further include PRB (or VRB) allocation information in the plurality of narrowbands together with the above-described plurality of narrowband allocation indication information.

Method 2. New Method for Allocating Resource Based on Narrowband

An entire system band may be defined as a type-2 narrowband (or enhanced narrowband) of a new size (for example, M PRBs, in this case, M is an arbitrary natural number satisfying M>6) based on the transmission/reception bandwidth of the PDSCH/PUSCH of the HeMTC, and the resource is allocated for the PDSCH/PUSCH of the HeMTC terminal based thereon.

That is, when the DCI format which transmits PDSCH/PUSCH resource allocation information of an arbitrary HEMTC terminal is configured, it may be defined to include the type-2 narrowband (or enhanced narrowband) allocation information. In this case, the M value may be determined based on the PDSCH/PUSCH transmission/reception bandwidth of the HeMTC and the system bandwidth, or the M value may be set through cell-specific/UE-specific RRC signaling. The M value is the number of consecutive PRBs which configure one type-2 narrowband.

Additionally, the DCI format which transmits the PDSCH or PUSCH resource allocation information of the HeMTC terminal may further include PRB (or VRB) allocation information in the type-2 narrowband (or enhanced narrowband) together with the above-described type-2 narrowband (or enhanced narrowband) allocation indication information.

Method 3. Resource Allocation Based on Normal LTE DCI Format

It may be defined to reuse a DCI format (for example, DCI format 1A for PDSCH and DCI format 0 for PUSCH) defined for a normal LTE terminal, as a DCI format for transmitting resource allocation information for the PDSCH/PUSCH of the HeMTC terminal. When the DCI is monitored through MPDCCH based search space, the HeMTC terminal may be determined to perform blind decoding based on a DCI format for a typical LTE terminal without performing blind decoding based on an existing DCI format (that is, DCI format 6-0A, 6-0B, and 6-1A and 6-1B) defined for the MPDCCH.

Point 2. Method for Monitoring DCI of HeMTC Terminal

As described in Point 1, in the case of the HeMTC terminal, in order to allocate PDSCH/PUSCH resources, it is necessary to define a new resource allocating method and a corresponding new DCI format, which are different from a resource allocating method defined for rel-13 BL/CE UE and the DCI format 6 series. However, for the HeMTC terminal, it is also necessary to monitor the resource allocating method based on the narrowband defined for rel-13 BL/CE UE and the DCI formats 6-1A, 6-1B, or 6-0A, 6-0B or 6-2 in accordance with a set CE mode and a type of message expected to be received (for example, unicast traffic, RAR, or paging).

For example, in the case of type-0, type-1, type-2 common search space, the HeMTC terminal follows the DCI format defined for rel-13 BL/CE UE and the method of allocating the PDSCH/PUSCH resources according to the DCI format. Further, only the USS needs to be defined to follow a DCI format newly defined for the HeMTC terminal and the method for allocating resources according to the DCI format.

Additionally, only when the USS is set to be CEModeA, the USS follows a DCI format newly defined for the HeMTC terminal and the method for allocating resources according to the DCI format. When the USS is set to be CEModeB, the UCC follows the monitoring for the typical DCI format 6-1B and DCI format 6-0B and method for allocating resources according to the DCI format.

Alternatively, an information area indicating whether to indicate existing narrowband based resource allocation defined in rel-13 and whether to indicate a new resource allocating method based on an extended bandwidth is included in the newly defined DCI format so that it is defined to allow the terminal to set whether to apply the rel-13 resource allocating method and a new resource allocating method based on an extended bandwidth.

FIG. 10 is a view illustrating a method for allocating data channel resources in a wireless communication system according to the present exemplary embodiments.

Referring to FIG. 10, in accordance with at least one embodiment, a narrowband is configured as six consecutive PRBs which configure the entire system bandwidth in the wireless communication system.

Further, a wideband is configured with N non-overlapping narrowbands in narrowbands configuring the system bandwidth.

Here, N indicates the number of the narrowbands configuring one wideband. N may be determined based on the number of narrowbands which configure the entire system bandwidth.

For example, when the number of narrowbands which configure the entire system bandwidth is equal to or greater than 4, four non-overlapping narrowbands are used to configure one wideband. That is, when the number of narrowbands which configure the entire system bandwidth is equal to or greater than 4, N is set to 4.

For another example, when the number of narrowbands which configure the entire system bandwidth is smaller than 4, all narrowbands which configure the system bandwidth may be used to configure one wideband. That is, the number of widebands which configure the entire system is set to one.

The narrowbands which configure one wideband may be configured in order of increasing narrowband number.

In the narrowbands which configure the system bandwidth, one or more narrowbands are allocated as a resource for transmission/reception of the data channel at step S1010.

Information indicating allocation of the narrowband is transmitted through downlink control information (DCI) at step S1020.

Here, the downlink control information (DCI) may include information indicating an index of the narrowband starting from a narrowband allocated for transmission/reception of the data channel.

When N non-overlapping narrowbands configure one wideband, the downlink control information DCI may include information indicating an index of the wideband.

A resource allocated for transmission/reception of the data channel is identified through i) information on allocation of narrowbands included in the downlink control information (DCI) and ii) information indicating an index of starting narrowband or an index of the wideband. The data channel may be transmitted/received through the resource.

Figure 11:
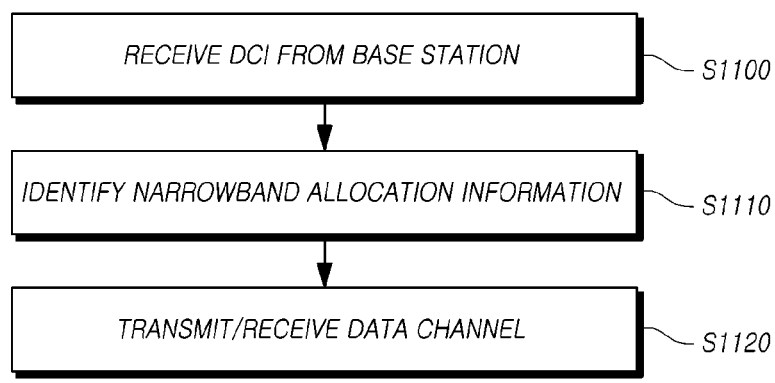
FIG. 11 is a view illustrating a method for monitoring allocation of data channel resources in a wireless communication system according to the present exemplary embodiments.

FIG. 11 is a view illustrating a method for monitoring allocation of a data channel in a wireless communication system according to the present exemplary embodiments.

Referring to FIG. 11, a terminal receives downlink control information (DCI) indicating data channel resource allocation from a base station in a wireless communication system at step S1100.

The downlink control information (DCI) may include information indicating an index of a starting narrowband from one or more narrowbands allocated for transmission/reception of the data channel.

Alternatively, when N non-overlapping narrowbands configure one wideband, information indicating an index of the wideband may be included.

Here, the number N of narrowbands which configure one wideband may be determined based on the number of narrowbands which configure the entire system bandwidth, and one wideband is configured in order of increasing index of the narrowbands which configure the system bandwidth.

The terminal identifies information on allocation of one or more narrowbands for transmission/reception of a data channel through the downlink control information DCI and an index of starting narrowband or an index of a wideband at step S1110.

The terminal transmits/receives the data channel based on narrowband allocation information which is identified through the downlink control information (DCI).

By doing this, the BL/CE UE defined in 3GPP Release-13 may transmit/receive the data channel using the extended data channel resource.

Figure 12:
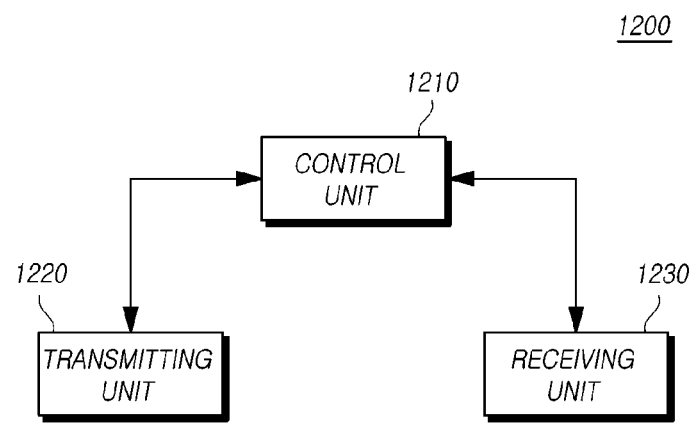
FIG. 12 is a view illustrating a base station according to the present exemplary embodiments.

FIG. 12 is a view illustrating a base station 1200 according to the present exemplary embodiments.

Referring to FIG. 12, a base station 1200 according to the present exemplary embodiments includes a control unit 1210, a transmitting unit 1220, and a receiving unit 1230.

The control unit 1210 controls an overall operation of the base station 1200 which is required to perform operations for resource allocation, corresponding DCI format for HeMTC, and a DCI monitoring method of HeMTC terminals in accordance with the embodiments of the present disclosure.

The transmitting unit 1220 and the receiving unit 1230 are used to transmit and receive signals, messages, and data to and from the terminal in order to implement the embodiments of the present disclosure.

Figure 13:
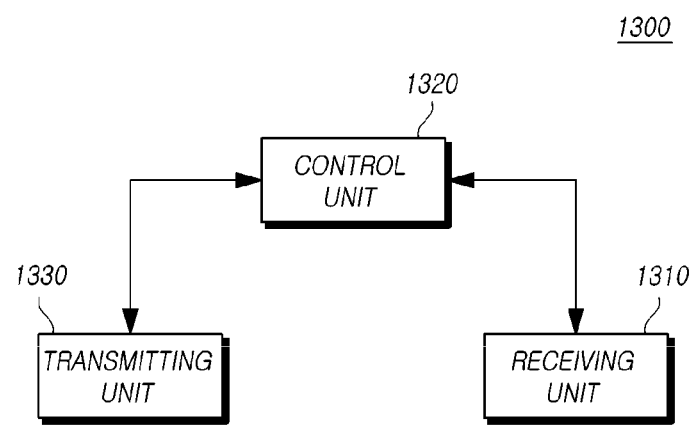
FIG. 13 is a view illustrating a user terminal according to the present exemplary embodiments.

FIG. 13 is a view illustrating a user terminal 1300 according to the present exemplary embodiments.

Referring to FIG. 13, a user terminal 1300 according to the present exemplary embodiments includes a receiving unit 1310, a control unit 1320, and a transmitting unit 1330.

The receiving unit 1310 receives downlink control information, data, and messages through a corresponding channel from the base station.

The control unit 1320 controls an overall operation of the user terminal 1300 which is required to perform operations for resource allocation, the corresponding DCI format for HeMTC, and a DCI monitoring method of HeMTC terminals in accordance with the embodiments of the present disclosure.

The transmitting unit 1330 transmits, to the base station, uplink control information, data, and messages through a corresponding channel.

Standard contents and standard documents mentioned in the above-described exemplary embodiments are omitted for simplicity of description of the specification and configure a part of the specification. Therefore, it should be interpreted that when partial contents of the standard contents and standard documents are added to the specification or described in the claims, it is also covered by the scope of the present disclosure.

It will be appreciated that various exemplary embodiments of the present disclosure have been described herein for purposes of illustration, and that various modifications, changes, and substitutions may be made by those skilled in the art without departing from the scope and spirit of the present disclosure. Therefore, the exemplary embodiments of the present disclosure are provided for illustrative purposes only but not intended to limit the technical spirit of the present disclosure. The scope of the technical spirit of the present disclosure is not limited thereto. The protective scope of the present disclosure should be construed based on the following claims, and all the technical concepts in the equivalent scope thereof should be construed as falling within the scope of the present disclosure.

What is claimed is:

1. A method for allocating a data channel resource in a wireless communication system, the method comprising:
    configuring at least one narrowband using physical resource blocks which configure a system bandwidth, wherein each of the at least one narrowband includes six consecutive physical resource blocks;
    allocating one or more narrowbands, among the configured at least one narrowband, for transmitting/receiving a data channel; and
    transmitting information indicating the allocation of one or more narrowbands through downlink control information,
    wherein the downlink control information includes information indicating an index of a wideband configured with N non-overlapping narrowbands in the narrowbands which configure the system bandwidth, where N is an integer number greater than 0.

2. The method according to claim 1, wherein the downlink control information includes information indicating an index of a starting narrowband of the allocated one or more narrowbands.

3. The method according to claim 1, wherein when the number of narrowbands which configure the system bandwidth is equal to or greater than 4, the wideband is configured by four non-overlapping narrowbands.

4. The method according to claim 1, wherein the wideband which configures the system bandwidth is configured in order of increasing narrowband number.

5. A method for monitoring allocation of a data channel resource in a wireless communication system, the method comprising:
    receiving downlink control information from a base station;

identifying one or more narrowbands allocated for transmission/reception of a data channel through the downlink control information; and transmitting/receiving the data channel through the one or more allocated narrowbands, wherein the downlink control information includes information on the one or more narrowbands allocated for transmission/reception of the data channel among at least one narrowband configured using physical resource blocks of a system bandwidth, where each of the at least one narrowband includes six consecutive physical resource blocks, and wherein the downlink control information includes information indicating an index of a wideband configured with N non-overlapping narrowbands in the narrowbands which configure the system bandwidth.

6. The method according to claim 5, wherein the downlink control information includes information indicating an index of a starting narrowband of the one or more allocated narrowbands.

7. The method according to claim 5, wherein when the number of narrowbands which configure the system bandwidth is equal to or greater than 4, the wideband is configured by four non-overlapping narrowbands.

8. The method according to claim 5, wherein the wideband which configures the system bandwidth is configured in order of increasing narrowband number.

9. A base station for allocating a data channel resource in a wireless communication system, the base station comprising:

a control unit is configured to configure at least one narrowband using physical resource blocks which configure a system bandwidth, allocate one or more narrowbands among the configured at least one narrowband for transmitting and receiving a data channel, and generate downlink control information including information indicating the allocation of one or more narrowbands, wherein each of the at least one narrowband includes six consecutive physical resource blocks; and a transmitting unit configured to transmit the downlink control information to a terminal, wherein the downlink control information includes information indicating an index of a wideband configured with N non-overlapping narrowbands in the narrowbands which configure the system bandwidth, where N is an integer number greater than 0.

10. The base station according to claim 9, wherein the downlink control information includes information indicating an index of a starting narrowband of the one or more allocated narrowbands.

11. The base station according to claim 9, wherein when the number of narrowbands which configure the system bandwidth is equal to or greater than 4, the wideband is configured by four non-overlapping narrowbands.

12. The base station according to claim 9, wherein the wideband which configures the system bandwidth is configured in order of increasing narrowband number.

13. A terminal for monitoring allocation of a data channel resource in a wireless communication system, the terminal comprising:

a receiving unit configured to receive downlink control information from a base station; and a control unit configured to identify one or more narrowbands allocated for transmitting and receiving a data channel through the downlink control information and control transmission/reception of the data channel through the one or more allocated narrowbands, wherein the downlink control information includes information on the one or more narrowbands allocated for transmission/reception of the data channel among at least one narrowband configured using physical resource blocks of a system bandwidth, where each of the at least one narrowband includes six consecutive physical resource blocks, and wherein the downlink control information includes information indicating an index of a wideband configured with N non-overlapping narrowbands in the narrowbands which configure the system bandwidth, where N is an integer number greater than 0.

14. The terminal according to claim 13, wherein the downlink control information includes information indicating an index of a starting narrowband of the one or more allocated narrowbands.

15. The terminal according to claim 13, wherein when the number of narrowbands which configure the system bandwidth is equal to or greater than 4, the wideband is configured by four non-overlapping narrowbands.

16. The terminal according to claim 13, wherein the wideband which configures the system bandwidth is configured in order of increasing narrowband number.

* * * * *